United States Patent
Howard et al.

[11] Patent Number: 5,436,047
[45] Date of Patent: Jul. 25, 1995

[54] THIN FILM MAGNETIC RECORDING DISK COMPRISING A METALLIC DISK BLANK, A SUBSTANTIALLY NON-MAGNETIC NI-CR-O FILM HAVING A TEXTURED SURFACE AND A MAGNETIC FILM

[75] Inventors: James K. Howard, Morgan Hill; Hung-Chang W. Huang, San Jose; Cherngye Hwang, San Jose; Anthony W. Wu, San Jose, all of Calif.

[73] Assignee: International Business Machines Corporation, Armonk, N.Y.

[21] Appl. No.: 138,934

[22] Filed: Oct. 15, 1993

Related U.S. Application Data

[63] Continuation of Ser. No. 764,582, Sep. 24, 1991, abandoned.

[51] Int. Cl.⁶ .................................................. G11B 5/00
[52] U.S. Cl. .................................. 428/64.2; 428/141; 428/336; 428/469; 428/693; 428/694 TS; 428/694 ST; 428/694 SG; 428/697; 428/702; 428/900; 428/938
[58] Field of Search .................. 428/64, 65, 432, 611, 428/641, 651, 652, 692, 693, 694, 701, 702, 900, 928, 469, 694 TS, 694 ST, 694 SG, 141, 336, 469, 697, 938

[56] References Cited

U.S. PATENT DOCUMENTS

| | | | |
|---|---|---|---|
| 3,110,613 | 11/1963 | Bean | 336/234 |
| 3,864,093 | 2/1975 | Wolfla | 428/472 |
| 4,472,248 | 9/1984 | Koskenmaki | 204/43 P |
| 4,511,635 | 4/1985 | Nagao et al. | 428/694 |
| 4,592,948 | 6/1986 | Kohmoto et al. | 428/216 |
| 4,828,905 | 5/1989 | Wada et al. | 428/213 |
| 4,940,511 | 7/1990 | Fontana, Jr. et al. | 156/656 |

FOREIGN PATENT DOCUMENTS

| | | |
|---|---|---|
| 62-129934 | 12/1985 | Japan . |
| 61-199236 | 9/1986 | Japan . |
| 61-202326 | 9/1986 | Japan . |
| 02216609 | 2/1989 | Japan . |

*Primary Examiner*—Stevan A. Resan
*Attorney, Agent, or Firm*—James C. Wilson; Thomas R. Berthold

[57] ABSTRACT

A magnetic recording disk has an improved surface film formed on the disk blank. A sputter-deposited surface coating containing nickel, chromium and oxygen (Ni—Cr—O) is formed on a AlMg disk blank, after which a cobalt alloy magnetic layer is formed over the Ni—Cr—O coating and a protective overcoat is formed over magnetic layer. The use of the Ni—Cr—O coating on the disk blank eliminates the need for a wet electroless deposition process for creation of a surface coating and results in an inherent texturing of the subsequently deposited magnetic film and protective overcoat which conform to the surface texture of the sputter-deposited Ni—Cr—O. The disks made with the Ni—Cr—O surface film exhibit a very low static friction force between the air-bearing slider and the disk surface when the disks are used in contact start/stop (CSS) disk files.

8 Claims, 1 Drawing Sheet

THIN FILM MAGNETIC RECORDING DISK COMPRISING A METALLIC DISK BLANK, A SUBSTANTIALLY NON-MAGNETIC NI-CR-O FILM HAVING A TEXTURED SURFACE AND A MAGNETIC FILM

This application is a continuation of U.S. patent application Ser. No. 07/764582 filed on Sep. 24, 1991, now abandoned.

TECHNICAL FIELD

This invention relates to thin film metal alloy magnetic recording disks, and in particular to an improved disk substrate and a process for the manufacture of the substrate.

BACKGROUND OF THE INVENTION

In many types of rotating rigid disk files, each of the read/write transducers or heads is supported on a carrier (or slider) which rides on a cushion or bearing of air above the surface of the disk when the disk is rotating at its operating speed. The slider is connected to a linear or rotary voice coil actuator by means of a relatively fragile suspension. There is generally a stack of disks and a number of actuators with each actuator supporting a number of sliders. The actuators move the sliders radially between the disk so that each head may access the recording area of a respective disk.

In these conventional disk files the slider is biased against the disk surface by a small force from the suspension when the disk is not rotating. The slider is thus in contact with the disk surface from the time the disk file is turned on until the disk reaches a speed sufficient to cause the slider to ride on the air-bearing. The slider is again in contact with the disk surface when the disk file is turned off and the rotational speed of the disk falls below that necessary to create the air-bearing. In such contact start/stop (CSS) disk files a lubricant is often maintained on the disk surface to prevent damage to the head and the disk during starting and stopping of the disk.

A serious problem with such disk files is that after the slider has been in stationary contact with the disk surface for just a short period of time, the slider tends to resist translational movement or "stick" to the disk surface. This "stiction" is caused by a variety of factors, including static friction and viscous shear forces and surface tension created by the lubricant between the disk and the slider. Even in those disk files which have disks with extremely smooth unlubricated disk surfaces, stiction may occur because of the strong intermolecular attraction at the interface between the smooth disk and slider surfaces. Stiction in a disk file can result in damage to the head or disk when the slider suddenly breaks free from the disk surface when disk rotation is initiated. In addition, because the suspension between the actuator and the slider is relatively fragile in order to permit the slider to fly above the disk surface, sudden rotation of the disk can also damage the suspension.

Thin film metal alloy magnetic recording disks for use in such disk files typically comprise a substrate, such as an aluminum-magnesium (AlMg) alloy disk blank with a nickel-phosphorous (NiP) surface coating, a cobalt-based alloy sputter-deposited as the magnetic layer on the substrate, and a protective overcoat, such as a sputter-deposited amorphous carbon or amorphous hydrogenated carbon film, formed on the magnetic layer. Such disks may also include a sputter-deposited underlayer, such as a layer of chromium (Cr), between the substrate and the magnetic layer. The NiP coating is formed on the AlMg disk blank by electroless deposition from an aqueous solution. The NiP coating covers up imperfections on the AlMg surface and provides hardness in order to minimize any damage to the disk caused by the slider during operation of the disk file.

Prior to the sputter deposition of the cobalt alloy magnetic layer or the Cr layer on the disk substrate, the NiP coating is polished so that the subsequently deposited films, which will conform to the surface topography of the NiP coating, are as smooth as possible. When the disks are of the type for use in CSS disk files, mechanical texturing may also be performed on the NiP surface coating, or at least on the portion of the NiP surface coating where the air-bearing slider will come to rest on the disk. The mechanical texturing is required to minimize the effect of stiction.

What is desired is a disk substrate which has improved properties over those provided by the NiP coating, which is more compatible with the conventional process of sputter deposition of the films making up the magnetic recording disk structure, and which eliminates the need for mechanical texturing.

SUMMARY OF THE INVENTION

The invention is a thin film metal alloy magnetic recording disk wherein the substrate comprises a disk blank having a surface coating of a sputter-deposited film containing nickel, chromium and oxygen. In the preferred embodiment the Ni—Cr—O films are sputter-deposited from a target which contains chromium dioxide ($Cr_2O_3$) and uniformly distributed particles of nickel-chromium ($Ni_{80}Cr_{20}$) alloy. The sputter deposition of the Ni—Cr—O film is compatible with the sputter deposition of the subsequent cobalt alloy and carbon films in the fabrication of the disk. This eliminates the need for the separate incompatible process step of electroless deposition of a NiP surface coating. In addition, because of the inherent columnar film growth of the Ni—Cr—O film during sputter deposition, a controlled roughness can be induced on the substrate which eliminates the need for mechanical texturing.

For a fuller understanding of the nature and advantages of the present invention, reference should be made to the following detailed description taken in conjunction with the accompanying drawing.

DESCRIPTION OF THE PREFERRED EMBODIMENTS

Figure 1:
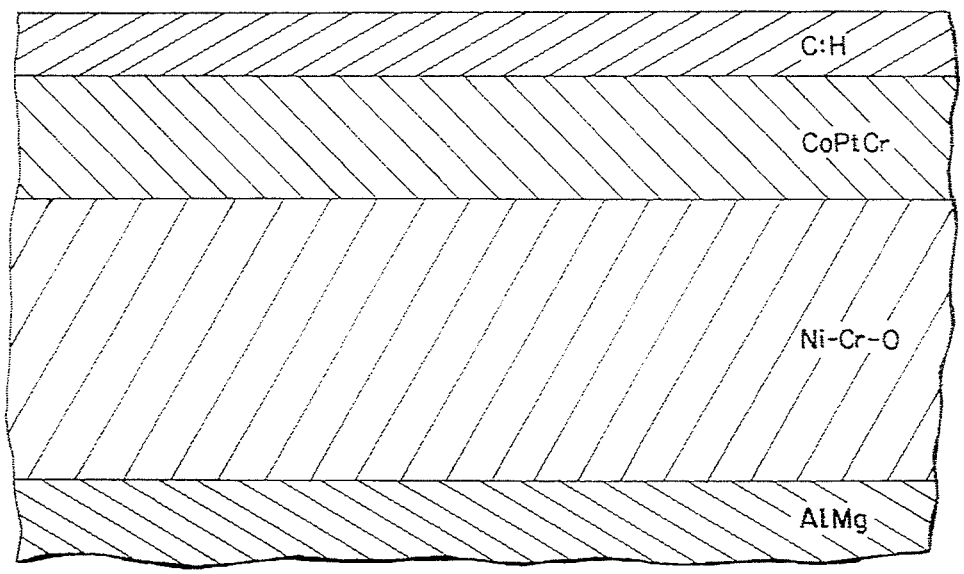
FIG. 1 is a schematic of a sectional view of a magnetic recording disk made according to the present invention.

Referring to FIG. 1, a sectional view of a completed magnetic recording disk made according to the present invention is illustrated. The disk comprises an AlMg disk blank, the Ni—Cr—O sputter-deposited coating on the AlMg disk blank, a CoPtCr alloy magnetic film, and a sputter-deposited amorphous hydrogenated carbon protective overcoat formed over the CoPtCr alloy magnetic film. Several disks like those illustrated in FIG. 1 were made with Ni—Cr—O films of various thicknesses on the disk blanks. These disks were then CSS tested in disk files with Al$_2$O$_3$/TiC ceramic air-bearing sliders in an environment of approximately 10 percent relative humidity (RH).

In one particular example, a highly polished AlMg disk blank was placed in an RF diode sputtering system in the presence of a sputtering target containing approximately 80 atomic percent Cr$_2$O$_3$ with approximately 20 atomic percent metallic Ni$_{80}$Cr$_{20}$ particles uniformly distributed throughout the Cr$_2$O$_3$. The base pressure in the sputtering chamber was maintained at $10^{-7}$ Torr, sputter power was at 400 watts and the sputtering gas was at 20 mTorr Argon. Under these conditions a 4.2 micron thick Ni—Cr—O film was formed on the AlMg disk blank at a deposition rate of approximately 100 Angstroms per minute. The resultant Ni—Cr—O film had low stress ($5 \times 10^8$ dyne per cm$^2$), high hardness (10–15 GPA) and high electrical resistivity ($10 \times 10^{10}$ micro-Ohm-cm). It is believed that the resulting Ni—Cr—O film is an essentially amorphous film containing nickel-chromium and various oxides of chromium, so that the film may also be referred to as a NiCrO$_x$ film, where x is between approximately 40 and 50 atomic percent.

Without any further surface treatment a cobalt alloy magnetic film of CoPtCr was then sputter deposited to a thickness of 300 Angstroms on top of the Ni—Cr—O coating. Thereafter an amorphous hydrogenated carbon protective overcoat was sputter deposited in an Ar—H$_2$ atmosphere to a thickness of 200 Angstroms on top of the CoPtCr alloy magnetic film. The disk was then washed and lubricated with approximately 20 Angstroms of a perfluoroalkylpolyether lubricant. A CSS test was performed with a Al$_2$O$_3$/TiC ceramic slider maintained with approximately a 15 gram load on the suspension and in an atmosphere of approximately 10 percent RH. The CSS test was terminated at 22,000 cycles with an average stiction force measured at less than 10 grams throughout the 22,000 cycle CSS test.

By comparison, disks made with the NiP electroless deposited surface coating on the AlMg substrate generally exhibit higher stiction in a matter of just a few CSS cycles and fail due to stiction.

Figure 2:
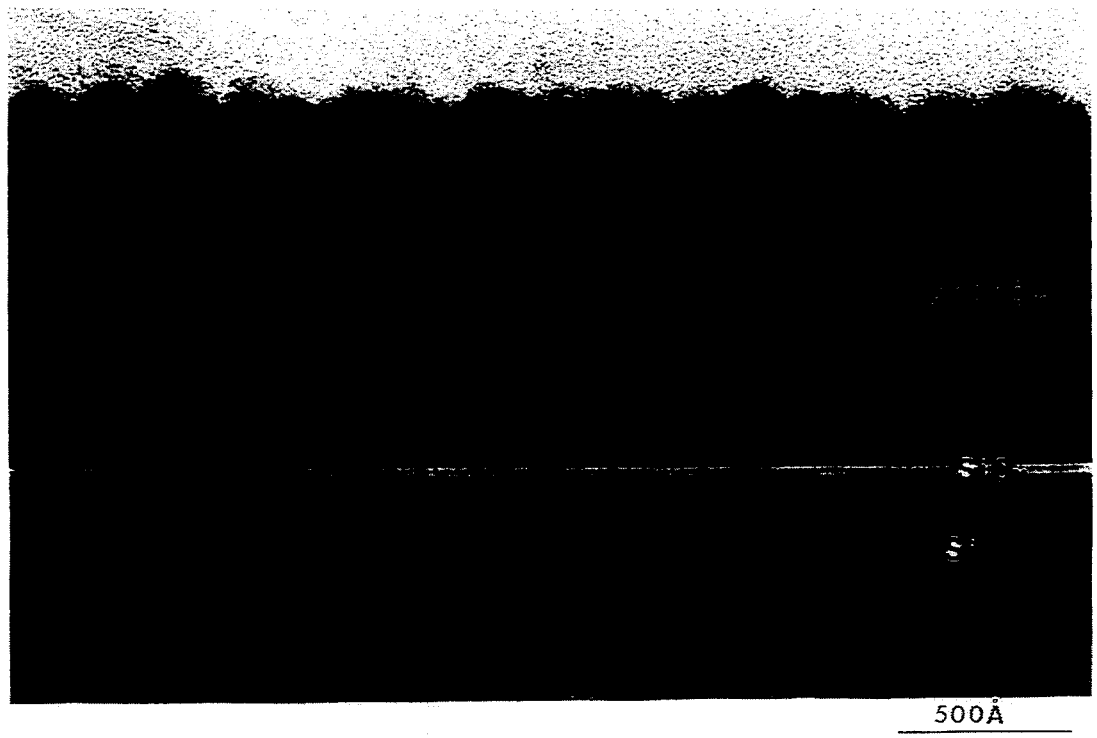
FIG. 2 is a transmission electron microscopy (TEM) image of a Ni—Cr—O film on a silicon disk blank.

The Ni—Cr—O film has several properties which make it desirable for use in the manufacture of magnetic recording disks. It is very hard yet has very low intrinsic stress, thus giving it excellent adhesion to the disk blank. It behaves like a dielectric material in terms of corrosion resistance. It has a relatively high deposition rate and its deposition process is compatible with the sputter deposition of subsequent layers in the manufacture of thin film metal alloy magnetic recording disks. In addition, because of its inherent columnar growth during sputter deposition, it has an inherent "roughness" which eliminates the need for mechanical texturing. This columnar film growth and inherent surface texturing can be seen in FIG. 2, which is a transmission electron microscopy (TEM) image of a 1000 Angstrom thick Ni—Cr—O film sputter deposited on a single crystal silicon (Si) disk blank having a native silicon oxide film on its surface. The subsequently deposited cobalt alloy magnetic film and protective carbon overcoat conform to the surface of the Ni—Cr—O film and create an inherent texture which reduces the stiction when the disks are used in CSS disk files.

While in the examples described above, the Ni—Cr—O film was formed on AlMg and Si disk blanks, the invention is also compatible with other types of substrates, such as those made of glass.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A thin film magnetic recording disk comprising: a metallic disk blank; a substantially non-magnetic Ni—Cr—O film consisting essentially of chromium oxides and nickel-chromium sputter deposited directly on the disk blank from a target or set of targets containing nickel, chromium and oxygen, said Ni—Cr—O film having an essentially amorphous and columnar structure for forming a textured surface on said Ni—Cr—O film; and a magnetic film formed over the Ni—Cr—O film which substantially replicates the textured surface of said Ni—Cr—O film.

2. The disk according to claim 1 wherein the disk blank is an aluminum alloy disk blank.

3. The disk according to claim 1 wherein oxygen comprises 40 to 50 atomic percent of said Ni—Cr—O film.

4. A substrate for use in a thin film magnetic recording disk comprising:

a metallic disk blank; and a substantially non-magnetic Ni—Cr—O film consisting essentially of chromium oxides and nickel-chromium sputter deposited directly on the disk blank from a target or set of targets containing nickel, chromium and oxygen, said Ni—Cr—O film having an essentially amorphous and columnar structure for forming a textured surface on said Ni—Cr—O film.

5. The substrate according to claim 4 wherein the disk blank is an aluminum alloy disk blank.

6. The substrate according to claim 4 wherein oxygen comprises 40 to 50 atomic percent of said Ni—Cr—O film.

7. A thin film magnetic recording disk comprising:

a disk blank;

a substantially non-magnetic Ni—Cr—O film consisting essentially of chromium oxides and nickel-chromium and having a thickness greater than 5 microns sputter deposited directly on the disk blank from a target or set of targets containing nickel, chromium and oxygen, said Ni—Cr—O film having an essentially amorphous and columnar structure for forming a textured surface on said Ni—Cr—O film; and a magnetic film formed over the Ni—Cr—O film which substantially replicates the textured surface of said Ni—Cr—O film.

8. A substrate for use in a thin film magnetic recording disk comprising:

a silicon disk blank; and a substantially non-magnetic Ni—Cr—O film consisting essentially of chromium oxides and nickel-chromium and having a thickness greater than 5 microns sputter deposited directly on the disk blank from a target or set of targets containing nickel, chromium and oxygen, said Ni—Cr—O film having an essentially amorphous and columnar structure for forming a textured surface on said Ni—Cr—O film.

* * * * *